3,551,358
MACROPOROUS ION-EXCHANGE RESINS
INCORPORATING A DRYING OIL
Paul D. Grammont and Louis E. Werotte, Chauny, France, assignors to Diamond Shamrock Corporation, Cleveland, Ohio, a corporation of Delaware
No Drawing. Filed Feb. 5, 1968, Ser. No. 702,814
Claims priority, application France, Mar. 13, 1967, 98,468
Int. Cl. C08f 27/07, 27/08
U.S. Cl. 260—2.2                                4 Claims

ABSTRACT OF THE DISCLOSURE

An improved ion-exchange resin is obtained by attaching strong anion- or cation-exchange groups to a polymer skeleton obtained by co-polymerizing a monovinyl aromatic monomer, a polyvinyl aromatic or aliphatic monomer and a drying oil.

BACKGROUND OF THE INVENTION

Strong anion- and cation-exchange resins are known to be manufactured by the co-polymerization of a monovinyl aromatic monomer, e.g., styrene, and a divinyl aromatic monomer, e.g., divinylbenzene, in order to obtain the desired polymer skeleton in a bead form. With such resins, however, difficulties are often encountered in attempting to attach the anion- or cation-exchange groups to the inert polymer skeleton, the methods of attaching these groups being conventional. Specifically, the ion-exchange beads so obtained are cracked, said cracking becoming apparent during the subsequent use of the resin. Various methods have been proposed for overcoming this difficulty. Most notably, the use of chlorinated and non-chlorinated hydrocarbon solvents has been advocated. However this method has not proven entirely satisfactory and the ion-exchange resins so obtained still do not have the required characteristics.

STATEMENT OF THE INVENTION

Therefore it is the object of this invention to remedy the aforesaid difficulties and to provide an ion-exchange resin, particularly a strong-acid ion-exchange resin, the bead structure of which is relatively free of cracks and breaks.

This and other objects and advantages of the present invention will become apparent to one skilled in the art from the description and claims which follow.

It has now been found that a polymer skeleton capable of being reacted by conventional means to attach anion- or cation-exchange groups in order to obtain a water-insoluble ion-exchange resin, is obtained by co-polymerizing a monovinyl aromatic hydrocarbon, a polyvinyl hydrocarbon selected from the group consisting of aliphatic and aromatic polyvinyl hydrocarbons, and a drying oil. By this means there is obtained a polymer skeleton which may be reacted, by known methods and without special precautions being taken, to attach anion- or cation-exchange groups in order to obtain an ion-exchange resin free of cracks and breaks and having a better resistance to attrition than prior art resins. Furthermore, it has been found by the practice of the present invention that it is possible to carry out the reaction for the fixation of the anion- or cation-exchange groups to the polymer skeleton, at temperatures below those generally used in prior art methods.

DESCRIPTION OF THE PREFERRED EMBODIMENTS

The monovinyl aromatic hydrocarbons useful in the practice of this invention include any such compounds used for this purpose, e.g., styrene.

The polyvinyl aliphatic hydrocarbons useful in the practice of the present invention include, for example: 1,3-butadiene; isoprene; piperylene; chloroprene; 2,3-dimethyl-3-butadiene; 2,3-pentadiene; 1,4-pentadiene 1,5-hexadiene; 2,4-hexadiene; 2,5-dimethyl-2,4-hexadiene; octadiene; 3,7-dimethyl-1,6-octadiene; 2,6-dimethyl-2,6-octadiene; 7-methyl-2,4-octadiene; 2-methyl-6-methylene-2,7-octadiene; 1,3,1'-decadiene; hexachlorocyclopentadiene; cyclopentadiene and dicyclopentadiene. Illustrative of the polyvinyl aromatic hydrocarbons which may be used are divinylbenzene and trivinylbenzene.

The term "drying oils" is intended to include all drying or semi-drying oils, crude or refined, modified or unmodified. Common examples of these drying oils include linseed and castor oils, as such, oxidized or dehydrated. The quantity of drying oil to be used in the practice of this invention will vary within wide limits depending upon the porosity and the exchange rate desired in the final resin as well as the identity of the drying oil used. In general, however, it may be said that from 5–50% by weight of the total monomer mixture will be a drying oil.

In the practice of the present invention the polymer skeleton is first formed by any conventional polymerization process, usually a suspension polymerization process which permits obtaining the polymer resin in a bead form. To this polymer skeleton there are then attached the desired anion- or cation-exchange groups, again by conventional methods well known in the ion-exchange industry.

In order to illustrate certain of these methods and in order that one skilled in the art may more readily understand the practice of the present invention the following specific examples are afforded.

EXAMPLE 1

Into a 500 ml. flask equipped with an agitator, a thermometer and cooling means are placed 220 ml. of water, 70 gm. NaCl and 0.5 gram Cellosize W4400 (trademark of the Union Carbide Company for a hydroxyethyl cellulose). The temperature is raised to between 80° and 90° C. and there is then introduced into the flask a mixture of 115 grams styrene, 17 grams of divinylbenzene (62%), 18 grams of castor oil C30 (an oxidized castor oil sold by the Justin du Pont Company) and 1.25 grams benzoyl peroxide (85%). This mixture is then polymerized at a temperature of between 80° and 100° C. for 8 hours following which the polymer is filtered, washed and dried in an oven at 100° C. The polymer skeleton so obtained is in the form of white, opaque beads.

EXAMPLE 2

The procedure of Example 1 is repeated except that in this instance 18 grams of Pithrinol (a dehydrated castor oil having a viscosity of 150 poises sold by the Reichold Beckacite Company) is substituted for the castor oil C30. In this manner white, opaque beads are also obtained.

EXAMPLE 3

Into a flask as in Example 1 there are introduced 200 ml. of water and a small quantity of bentonite as a dispersant. To this there is added 111 grams styrene, 16.5 grams of divinylbenzene (62%), 22.5 grams of castor oil HR C 18 (a blown castor oil sold by the Justin du Pont Company) and 1.25 grams of benzoyl peroxide. Polymerization is carried out according to the practice of Example 1 and white, opaque, porous resin beads are obtained.

EXAMPLE 4

In a one-liter flask, 50 grams of the beads of Example 1 is heated at a temperature of between 80° and 105° C. for 10 hours with 350 grams of concentrated sulfuric acid. The resultant sulphonated resin is hydrated with water, filtered and washed to yield 200 ml. of a strong-acid cation-exchange resin having a capacity of 1.96 equivalents per liter in the sodium form and 4.41 equivalents per kilogram in the sodium form. Breakage measured according to the attrition test described in U.S. Pat. No. 3,418,262, is 4.37%.

EXAMPLE 5

In this example 50 grams of the beads of Example 2 is treated as in Example 4 to yield 230 ml. of a strong-acid cation-exchange resin having a capacity of 1.85 equivalents per liter in the sodium form and 4.54 equivalents per kilogram in the sodium form. Breakage, measured by the attrition test of Example 4, is 5.77%. Measurement of broken and cracked resin beads shows them to be present in the amount of 2.78%. This compares with 12% broken and cracked beads usually found in a good quality commercial ion-exchange resin.

EXAMPLE 6

The resin of Example 3 (50 grams), when treated as per Example 4, gives 270 ml. of a strong-acid cation-exchange resin having a capacity of 1.7 equivalents per liter in the sodium form and 4.54 equivalents per kilogram in the sodium form. Breakage by the attrition test is measured at 5%.

EXAMPLE 7

Into a flask containing one liter of water and a dispersing agent heated to a temperature of 65° C. the following mixture is introduced: 290 grams of styrene, 50 grams of divinylbenzene, 30 grams of linseed oil (bodied-30 poises) and 3 grams of benzoyl peroxide. After polymerization for 7 hours at 75°–80° C. and for one hour at 90° C., opalescent resin beads are obtained. These beads (40 grams) are then sulfonated using 200 grams of sulfuric acid (100%) for 2 hours at 100°–105° C. After treatment, the strong-acid cation-exchange resin so obtained is tested in the following manner: 3 liters of a solution of NaCl (50 grams per liter) is passed over 100 ml. of the resin beads in a 30 mm. column. The resin is then rinsed with water and treated with a solution of calcium chloride testing at 400 p.p.m. by the soap test. Treatment of the resin with the calcium chloride solution is continued until the solution tests 10 p.p.m. by this test. The flow rate of the calcium chloride solution through the resin is approximately 20 bed volumes per hour (2.5 gallons/minute/cubic foot). The resin beads have a capacity of 2 equivalents per liter in the calcium form.

EXAMPLE 8

A quantity of the ion-exchange resin of Example 3 (30 grams) is chloromethylated using 64 grams of chloromethyl ether and 25 grams of aluminum chloride in 100 ml. of petroleum ether. A portion of this chloromethylated resin is then aminated using trimethylamine. This results in a resin having a capacity of 1.12 equivalents per liter in the chloride form and 3 equivalents per kilogram in the chloride form. An additional portion of the chloromethylated resin is aminated using methylethanolamine and results in an anion-exchange resin having a capacity of 1.62 equivalents per liter in the hydroxide form, 1.54 equivalents per liter in the chloride form and 3.56 equivalents per kilogram in the chloride form.

It is notable that the resins prepared according to the sulfonation procedure of Examples 4–7 resist breakage during the hydration step, even when the resin beads have been only 80% sulfonated. For this reason it is subsequently found that the resistance of the resin beads in the attrition test is exceptional.

While the invention has been described with reference to certain specific embodiments thereof, it is not to be so limited since changes and alterations may be made therein which are within the full and intended scope of the appended claims.

What is claimed is:

1. A macroporous strong-acid cation-exchange resin which resin consists essentially of a sulfonated co-planar of styrene and divinylbenzene, the copolymer being produced by the reaction of styrene and divinylbenzene in the presence of a drying oil selected from the group consisting of castor oil, oxidized castor oil, dehydrated castor oil, linseed oil and oxidized linseed oil.

2. A macroporous anion-exchange resin which resin consists essentially of a chromomethylated and subsequently aminated copolymer of styrene and divinylbenzene, the copolymer being produced by the reaction of styrene and divinylbenzene in the presence of a drying oil selected from the group consisting of castor oil, oxidized castor oil, dehydrated castor oil, linseed oil and oxidized linseed oil.

3. A macroporous strong-acid cation-exchange resin which resin consists essentially of a sulfonated copolymer of;
  (a) styrene and,
  (b) a polyvinyl compound selected from the group consisting of divinylbenzene; trivinylbenzene; 1,3-butadiene; isoprene; piperylene; chloroprene; 2,3-dimethyl-3-butadiene; 2,3-pentadiene; 1,4-pentadiene; 1,5-hexadiene; 2,4-hexadiene; 2,5-dimethyl-2,4-hexadiene; octadiene; 3,7-dimethyl-1,6-octadiene; 2,6-dimethyl-2,6-octadiene; 7-methyl-2,4-octadiene; 2-methyl-6-methylene-2,7-octadiene; 1,3,5-decadiene; hexachlorocyclopentadiene; cyclopentadiene and dicyclopentadiene, the copolymer being produced by the reaction of styrene and said polyvinyl compound in the presence of a drying oil selected from the group consisting of castor oil, oxidized castor oil, dehydarted castor oil, linseed oil and oxidized linseed oil.

4. A macroporous anion-exchange resin which resin consists essentially of a chloromethylated and subsequently aminated copolymer of;
  (a) styrene and,
  (b) a polyvinyl compound selected from the group consisting of divinylbenzene; trivinylbenzene; 1,3-butadiene; isoprene; piperylene; chloroprene; 2,3-dimethyl-3-butadiene; 2,3-pentadiene; 1,4-pentadiene; 1,5-hexadiene; 2,4-hexadiene; 2,5-dimethyl-2,4-hexadiene; octadiene; 3,7-dimethyl-1,6-octadiene; 2,6-dimethyl-2,6-octadiene; 7-methyl-2,4-octadiene; 2-methyl-6-methylene-2,7-octadiene; 1,3,5-decadiene; hexachlorocyclopentadiene; cyclopentadiene and dicyclopentadiene, the copolymer being produced by the reaction of styrene and said polyvinyl compound in the presence of a drying oil selected from the group consisting of castor oil, oxidized castor oil, dehydrated castor oil, linseed oil and oxidized linseed oil.

(References on following page)

References Cited

UNITED STATES PATENTS

| | | | |
|---|---|---|---|
| 2,468,798 | 5/1949 | Young et al. | 260—23 |
| 2,830,961 | 4/1958 | Peterson et al. | 260—22 |
| 3,418,262 | 12/1968 | Werotte et al. | 260—2.2 |

FOREIGN PATENTS

| | | |
|---|---|---|
| 656,994 | 9/1951 | Great Britain. |
| 932,125 | 7/1963 | Great Britain. |
| 69,695 | 12/1960 | India. |

OTHER REFERENCES

Kolesov: Vysekomolekul. Soedin. 8, 650–55 (1966).

Helfferich: Ion Exchange. McGraw-Hill, New York 1962, pp. 35–39.

WILLIAM SHORT, Primary Examiner

MELVIN GOLDSTEIN, Assistant Examiner

U.S. Cl. X.R.

260—2.1, 23.5